(12) United States Patent
Bachelder et al.

(10) Patent No.: US 10,688,943 B2
(45) Date of Patent: Jun. 23, 2020

(54) HEAT STAKE ATTACHMENT FEATURE

(71) Applicant: Magna International Inc., Aurora (CA)

(72) Inventors: Theodore J. Bachelder, Vanderbilt, MI (US); Michael S. Gignilliat, Traverse City, MI (US)

(73) Assignee: Magna International Inc., Aurora (CA)

( * ) Notice: Subject to any disclaimer, the term of this patent is extended or adjusted under 35 U.S.C. 154(b) by 156 days.

(21) Appl. No.: 14/839,306

(22) Filed: Aug. 28, 2015

(65) Prior Publication Data

US 2016/0176363 A1    Jun. 23, 2016

Related U.S. Application Data

(60) Provisional application No. 62/093,062, filed on Dec. 17, 2014.

(51) Int. Cl.
*B60R 13/02* (2006.01)
*F16B 2/22* (2006.01)

(52) U.S. Cl.
CPC ............ *B60R 13/0206* (2013.01); *F16B 2/22* (2013.01)

(58) Field of Classification Search
CPC ........ B60R 13/0206; F16B 2/22; F16B 2/243; F16B 5/0621; F16B 5/0657; Y10T 24/30; Y10T 24/309; Y10T 24/44026; B29C 65/606

USPC .......... 403/270; 425/520; 411/504; 29/524.1, 29/509; 264/249, 263, 273; 52/512

See application file for complete search history.

(56) References Cited

U.S. PATENT DOCUMENTS

| 4,312,165 | A | * | 1/1982 | Mizusawa | B60R 13/0206 |
| | | | | | 411/510 |
| 5,086,997 | A | * | 2/1992 | Glass | B29C 66/721 |
| | | | | | 244/123.3 |
| 2009/0211065 | A1 | * | 8/2009 | Moerke | B60R 13/0206 |
| | | | | | 24/303 |
| 2013/0255065 | A1 | * | 10/2013 | Bachelder | B60R 13/0206 |
| | | | | | 29/525.01 |

FOREIGN PATENT DOCUMENTS

DE    202015101319 U1 *   6/2016   ........... A47C 20/041

* cited by examiner

*Primary Examiner* — Jack W Lavinder
(74) *Attorney, Agent, or Firm* — Warn Partners, P.C.

(57) ABSTRACT

A retainer for limited space attachment of a vehicle part with a class A surface to a vehicle. The retainer has a low profile portion and also an attachment base operable for being connected to heat stake ribs of the vehicle part. The attachment base includes at least one attachment aperture to provide attachment with the heat stake ribs. There is provided desired degrees of clip float and/or two-way limited clip float providing desired free movement of the clip when desired.

18 Claims, 5 Drawing Sheets

HEAT STAKE ATTACHMENT FEATURE

CROSS-REFERENCE TO RELATED APPLICATIONS

This application claims the benefit of U.S. Provisional Application No. 62/093,062, filed Dec. 17, 2014. The disclosure of the above application is incorporated herein by reference.

FIELD OF THE INVENTION

The present invention relates to a retainer assembly and method for providing a secure connection between a first attachable part such as an appliqué and the pillar or other component part of an automobile.

BACKGROUND OF THE INVENTION

The components of an automobile are connected together in many different ways. One type of connection uses a fastener, such as a bolt or screw.

The packaging space in vehicles is often very limited due to the number of components used to assemble the vehicle, the size of the vehicle, and the like. Some of the area between components, such as a B-pillar and an appliqué, is very limited. This requires some of the fastener designs to be very small. Typically, one type of connector used for retaining two components is a molded "doghouse." A doghouse is generally a molded-in feature which is used to attach a secondary clip, or the doghouse is used for driving a threaded screw.

Molded-in features, such as a doghouse, often cause a "read" condition on the show surface of a part due to differences in cooling temperatures between the feature and the substrate caused by differences in mass/volume of the resin. A read condition is a deformation or imperfection in a surface. The limited space also causes a tooling condition that is very fragile due to the reduced size. A feature of the type described above has a minimum workable size which does not facilitate the doghouse having suitable strength. The size of the part and the proximity of adjacent features limit the packaging space and travel of movable feature (lifters) in the mold. Certain design requirements also include a threaded primary fastener which dictates a secondary fastener of the type that accepts a screw. Current designs include a molded "boss" which is threadable, but tends to cause a read condition as discussed above, and also tends to break, increasing scrap during manufacturing.

Other designs have been created in an attempt to solve the aforementioned problems. One such design is insert molding of the threaded fasteners. Another design has incorporated the use of a "U-nut" or "J-nut," which are spring steel nuts that require a molded feature. A third attempted design is a molded in boss which is threadable by means of a self-tapping primary fastener. Another design has separately molded doghouses with adhesive backing applied to the part, which designs also lack suitable strength and do not meet space limitations in current low profile designs. However, none of these designs overcome the aforementioned problems. In another, a typical molded integral doghouse with a standard plastic winged clip is on the back side of a molded part and will generally produce visible defects on the finished side of the part. The low profile packaging space also does not provide for a robust tooling condition for a conventional molded doghouse.

Other design requirements are necessitating very low profile exterior ornamentations that present extremely low profile attachment challenges in order to attach to a component body. The packaging space provided in low profile designs is also not toolable from an injection molding perspective. Virtually all applications require tolerance control in the attachment. This requires either the attachment to move freely 360 degrees directionally (one plane) or must limit the free movement to just two directions (one plane). Current body attachments do not provide low profile designs that meet all of the aforementioned criteria simultaneously.

Accordingly, there exists a need for a retainer assembly which provides a suitable connection between an appliqué and a part, such as an A-pillar, B-pillar, or C-pillar of an automobile.

SUMMARY OF THE INVENTION

The present invention is directed to a retainer and method of attachment between two components. More specifically, the present invention includes a retainer for connection between the B-pillar or other component of an automobile, and an appliqué having a high-gloss surface, or other "show surface."

In one embodiment, there is provided a doghouse or "retainer" which includes a formed low profile spring steel base. The base includes a slightly raised low profile doghouse portion which includes a slot for receiving a base of a clip portion. The base also includes opposing attachment apertures for retention, thereby providing a heat stake feature for attaching to low profile molded retention ribs provided on the back side of molded part. The attachment aperture does not include serrations for holding of the doghouse onto a rib molded into the part. The doghouse is heat staked rather than a push-on doghouse. The spring steel base has a keyhole feature, e.g., that is either round or slotted, for 360 degrees of float and/or to limit winged clip float. Most preferably, in accordance with another embodiment the spring steel base is common for 360 degrees of clip float and two-way limited clip float providing desired free movement of the clip intrinsic to the clip design. Clip float limiters are provided when two-way clip float is desired.

There is additionally provided a nylon clip coupled to a low profile metal carrier with clip float features, and, nylon clip float limiters when desired.

The present invention includes a heat staked radial clip in one embodiment.

The present invention simplifies mold design, minimizes potential for a read condition, and provides a robust engagement for a winged clip type fastener in limited space.

It is an object of the invention to provide for attachment of the exterior ornamentation of an appliqué in a limited packaging space that is robust without introducing a read condition or breakage. It is another object of the invention to provide an attachment which is toolable in an injection molded part and which will meet a minimum pull off force without breakage while applied to the vehicle.

The present invention also provides design flexibility in term of secondary fastener orientation relative to adjacent features in the mold by means of simplified lifters, and provides a method of prevailing torque.

It is another object of the invention to minimize the risk associated with weak (small) tooling condition. It is another object of the invention to simplify the molding by minimizing lifter travel and lifter angle. It is yet another object of the invention to provide a prevailing torque on the primary fastener.

Principally, it is an objective of the invention to provide an attachment clip for extremely low profile vehicle ornamentation, high retention value given small size, heat stake retention, tolerance absorption, provide 360 degrees of float in the attachment for tolerance consideration, provide the option of limiting the float to two directions, and provide a simple and effective means of attaching the clip to a vehicle body ornamentation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

There is generally provided an assembly including a spring steel carrier with heat stake features and a winged clip connectable to the carrier. The invention provides a low profile permitting its use in extremely limited packaging space. The invention also provides an opening in the formed base to accept a molded plastic winged clip to provide an attachment means to the vehicle and maintain predetermined ergonomic application requirements depending upon the application. Alternatively, there is generally provided a heat staked radial clip. Preferably, there is provided a nylon clip coupled to a low profile metal carrier with clip float features and/or nylon clip float limiters for predetermined amount and direction of float. The embodiments all incorporate a heat stake feature with superior benefits over other designs.

Figure 1:
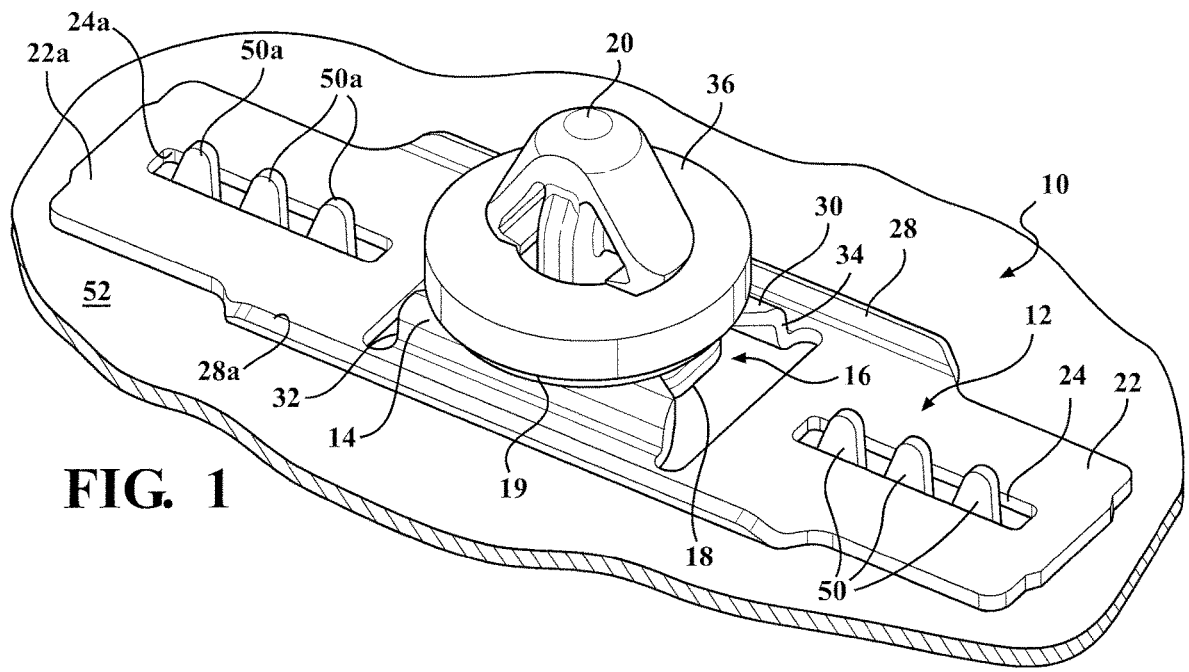
FIG. 1 is a perspective view of a retainer positioned for attachment to an appliqué, according to an embodiment of the present invention.
Figure 2:
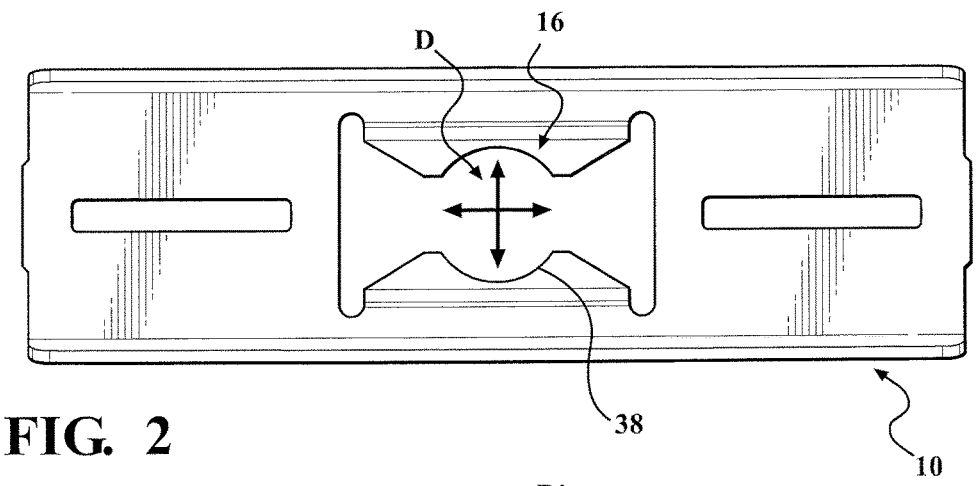
FIG. 2 is a top plan view of a retainer, without the winged clip attached, depicting a round keyhole in accordance with the present invention.
Figure 3:
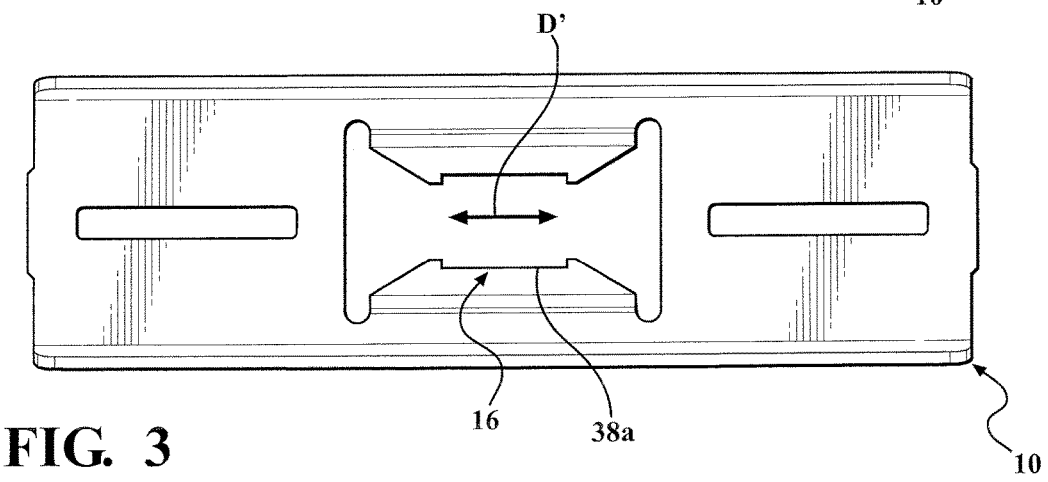
FIG. 3 is a top plan view of a retainer, without the winged clip attached, depicting a slotted keyhole in accordance with another embodiment of the present invention.
Figure 4:
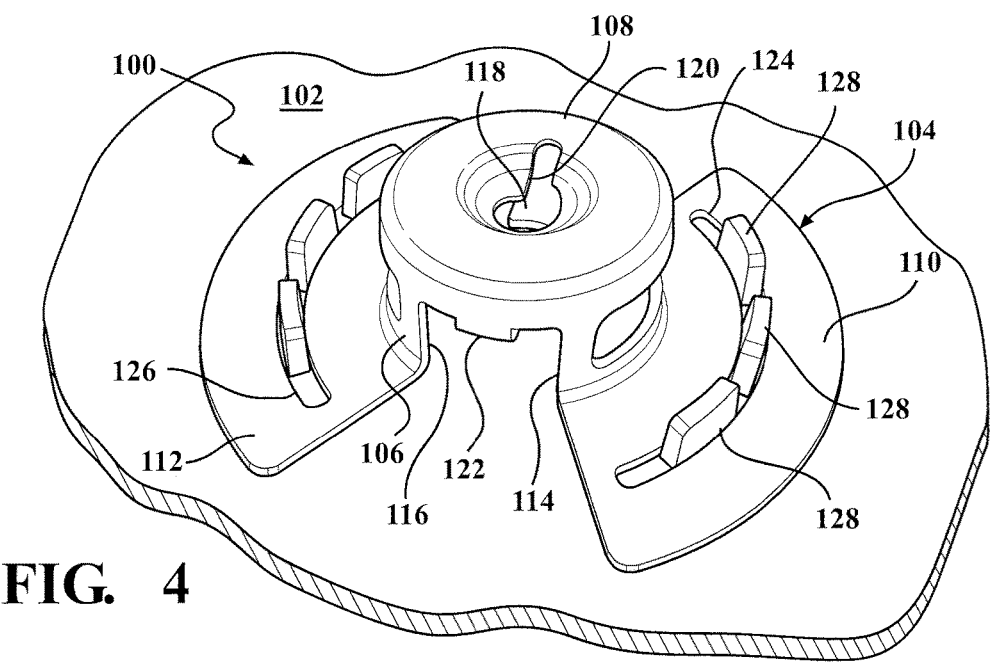
FIG. 4 is a perspective of a radial clip positioned for attachment to an appliqué, according to an alternative embodiment of present invention.
Figure 5:
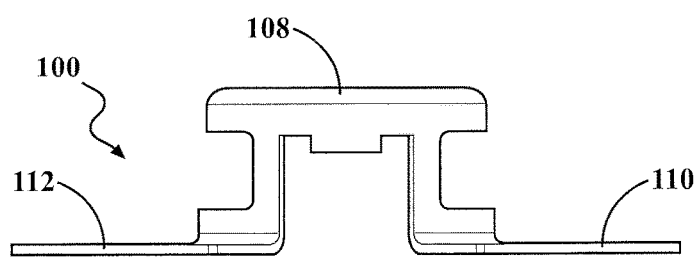
FIG. 5 is a front elevation view of the radial clip of FIG. 4 in accordance with the present invention.
Figure 7:
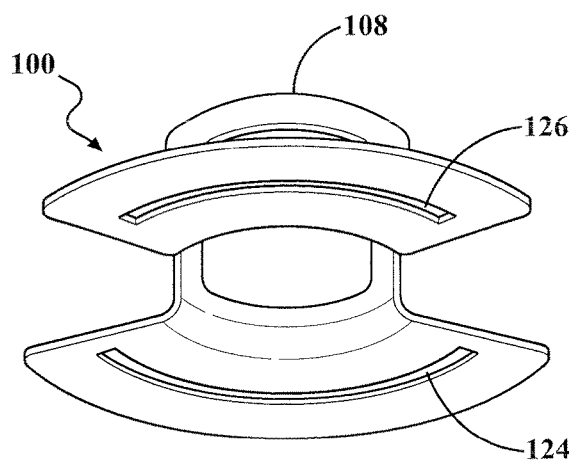
FIG. 7 is a bottom perspective view of the radial clip of FIGS. 4-6 in accordance with the present invention.
Figure 6:
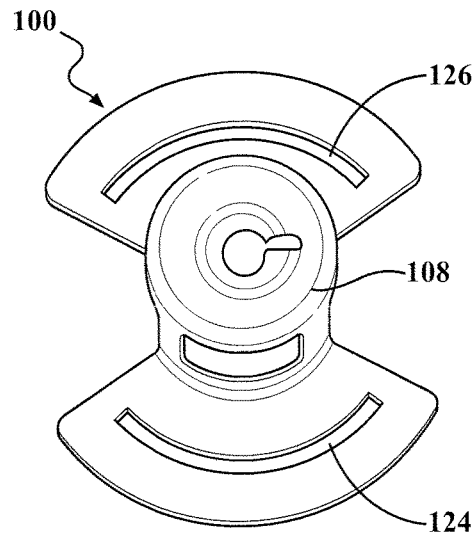
FIG. 6 is a top perspective view of the radial clip of FIGS. 4-5 in accordance with the present invention.

Referring now to FIGS. 1-3 there is provided a doghouse generally shown at 10 which is made from a metal material, preferably spring steel. Spring steel is defined as a steel that is processed in a manner to give it elastic properties and returns it to its original shape after removal of a load force. The composition of spring steel is generally defined to be low alloy, medium carbon (e.g. 0.30%-0.59% carbon content by weight of the steel) or high carbon content (e.g., 0.60%-0.99% carbon content by weight of the steel). Spring steel used in accordance with the present invention also has a high yield strength of generally 150-1650 MPa, ideally 250-690 MPa or preferably 250-520 MPa. Depending on the application the spring steel consists of other suitable material and properties as well as thickness to meet predetermined load requirements required in the particular application and also to return it to its original shape after removal of a load force without departing from the scope of the invention.

The doghouse 10 includes an attachment base generally indicated at 12 or "carrier" used interchangeably herein, which in this embodiment is a formed low profile spring steel base. The base 12 includes a slightly raised low profile doghouse portion 14 which includes a keyhole shown generally at 16 for receiving a clip base 18 of a clip portion 20 or securing portion. The base 12 includes at least one attachment portion 22 which includes a first attachment aperture 24 that is a heat staking slot to receive heat stake bosses or molded retention ribs 50 on the molded part. The attachment aperture 24 generally has smooth sides, without serrations, and is configured to provide a heat stake slot for holding of the retainer 10 onto the molded part 52 such as an appliqué which is attached.

Most preferably, the base 12 has a corresponding attachment portion 22a and two opposing attachment apertures 24, 24a spaced longitudinally along the same plane to each engage respective heat stake portions 50, 50a molded onto the part 52 (shown in FIG. 1). The attachment apertures 24, 24a require molded retention ribs 50, 50a in the back side of the molded part 52 that are low profile and are "in-line" having a tensile failure mode which produces a high "force to failure" result. The molded retention ribs 50, 50a in the back side of the molded part 52 are minimized to the point that is dictated by the minimum fill/height ratio in an injection mold that ensures a minimal risk of visible defects on the finished side of the molded part while ensuring robustness, e.g., high force to failure result. The base 12 has a predetermined very low profile permitting its use in extremely limited packaging space.

Accordingly, the retainer 10 provides heat staked attachment rather than "push-on". This provides a simple and robust means of attaching the clip 20 to the vehicle ornamentation. The heat stake feature also provides ease of clip 20 staging in assembly equipment (robotic). The heat stake feature is simple to tool in the spring steel base 12. Additionally, the heat stake feature allows for larger tolerances in robotic assembly processing and minimizes scrap produced by robotic "mis-hits" or short strokes, etc. In addition, the heat stake feature produces improved repeatability for clip extraction over current push-on's.

The base 12 also includes turned up carrier walls 28, 28a to improve carrier flatness following austempering process.

The low profile doghouse portion 14 includes a central clip attachment portion 30 which is separated from the base 12 by a pair of walls 32 and 34. Walls 32, 34 are configured to provide a height. The height is just high enough such that the base 18 of the clip 20 can be housed underneath inside of the doghouse portion 14. Preferably, the walls are generally vertical although they can be configured at an angle as long as a predetermined height of the doghouse is maintained.

The clip 20 also includes a middle portion 19 (indicated in FIG. 1) spaced apart from and creating a gap between the base 18 and middle portion 19 of the clip 20, so that the central clip attachment portion 30 slides into the gap by a keyhole attachment in the slot or keyhole 16 of the doghouse raised portion 14. The presence of the middle portion 19 helps the clip 20 frictionally engage the central clip attachment portion 30 by creating a gap. It is within the scope of this invention for the middle portion 19 to not be present. The clip 20 also includes a washer 36, preferably, foam washer adjacent to the top surface of the middle portion 19 of the clip 20.

Depending on the application the clip 20 is a nylon plastic clip.

During assembly, the base 12 is moved towards the part or appliqué 52 such that each heat stake retention rib 50, 50a is in alignment with a corresponding aperture 24, 24a and then positioned through the corresponding aperture 24, 24a. The retention ribs 50, 50a are heat staked to prevent the retention ribs 50, 50a from being pulled out of the apertures 24, 24a, securing the connection between the doghouse 10 and the part or appliqué 52.

Once the base 12 with the clip 20 have been attached to a part or appliqué 52, the part is attached to the vehicle, e.g., to a B-pillar of a vehicle by press fitting the clip 20 into an aperture in the vehicle. In a preferred embodiment, the clip washer 36 provides the surface against which the vehicle part surrounding the aperture directly engages, rather than against the middle portion 19 of the clip 20 or base 12.

One of the advantages of the present invention is that only minimal retention ribs 50, 50a are required and that these ribs 50, 50a integrally formed with the appliqué 52 use a minimal amount of material. This greatly reduces or eliminates the amount of read condition on the outer surface of the appliqué 52, where it is necessary to have a high-gloss, or other esthetically pleasing appearance. The spring steel base configuration with the plastic winged clip design requires only minimal rib features molded on the back side of the molded part, and provides a robust attachment means to the vehicle. The molded retention rib features 50, 50a can also be easily molded using simple straight pull lifters in the mold and do not "read" on the finished side of the molded part. Further, the present invention eliminates the need for an adhesive backed application of an auxiliary type attachment having a low profile which is a practice in use today on some applications. There is also a high retention value given the small size.

Referring now to FIGS. 2 and 3 the keyhole 16 for retaining the clip 20 is shown in more detail. The keyhole 16 is open on at least one end to receive the clip 20, most preferably, open on opposing ends to receive the clip 20 in either direction into a central formed portion 38, 38a configured for desired float of the clip 20. In a first embodiment (FIG. 2) the keyhole 16 is a round keyhole for 360 degrees "D" of float of the winged clip 20. In a second embodiment (FIG. 3) the keyhole 16 is a slotted keyhole to limit winged clip float to two directions "D'" (e.g., horizontal direction toward either attachment portion 22, 22a). The reduced diameter of the clip 20 is slid laterally into the keyhole 16 and frictionally retained in the keyhole.

The inline design of the apertures 24, 24a are designed to provide an engineered tensile failure mode which allows for permanent attachment to the vehicle yet provides serviceability of the part if necessary. The use of the keyhole 16 arrangement and clip 20 allows for a floating clip 20 such that clip position may vary if tolerances in the parts to be attached are not exact.

Advantages include the opposing heat stake slots 24, 24a providing for optimum retention. Non-reading opposing retention rib attachment method to molded parts. Accepts a predetermined universal molded plastic winged clip. Replaces conventional doghouses. Two piece design (metal/plastic) allows for permanent attachment to the vehicle while the engineered failure mode allows for serviceability. Provides for floating fastener position, retention to sheet metal, i.e., tolerance absorption. The combination of the opposing heat stake slots 24 provide for optimum retention, Two piece design, and float are particularly critical features and beneficial to the invention.

Another embodiment of a retainer incorporating a method for attachment is shown in FIGS. 4-7 generally at 100 for attachment to a part or appliqué 102. The retainer 100 includes an attachment base or portion generally shown at 104 connected to a sidewall 106, which in this embodiment is a radial base. The retainer 100 is metal, preferably, steel. The sidewall 106 is connected to a securing portion 108. More specifically, the attachment base 104 includes at least a first attachment surface or portion 110 and a second attachment surface 112 or portion.

The sidewall 106 has a first sidewall 114 and a second sidewall 116. The first attachment surface 110 is connected to the first sidewall 114, and the second attachment surface 112 is connected to the second sidewall 116.

The securing portion 108 has an aperture 118 which is operable for receiving a fastener, such as a screw. The attachment base 104 and securing portion 108 are spaced from one another to allow clearance for a screw or other fastener to enter the area beneath the securing portion 108. The aperture 118 has a single thread engagement feature 120. In this embodiment, the securing portion 108 is circular in shape, and the sidewalls 114, 116 are curved to correspond to the shape of the securing portion 108. Also formed as part of the securing portion 108 are two torque features 122.

It is within the scope of the invention that the securing portion 108, the sidewalls 114, 116, and attachment base 104 may be formed separately. In this embodiment, the sidewalls 106, 114, 116, the securing portion 108, and the attachment base 104 are integrally formed together of a stamped steel which is austempered into spring steel. As an example, the steel is preferably 0.017 inches thick, and corrosion treated. The configuration of the sidewalls 114, 116 and the spring steel type and thickness are selected based on the torque tension specifications required in the particular application.

The first attachment surface 110 includes a first attachment aperture 124, and the second attachment surface 112 has a second attachment aperture 126. The retainer 100 is connected to a first attachable part, such as a panel for assembly to a vehicle. In this embodiment, the panel is an appliqué 102 for a second attachable part such as B-pillar of a vehicle. Integrally formed as part of the appliqué 102 are heat stake bosses or retention ribs 128.

The first and second attachment apertures 124, 126 do not include a plurality of gripping flanges, teeth, or serrations, which would grip the retaining ribs 128. Rather, the apertures 124, 126 have a generally smooth sidewall and are operably sized and shaped providing heat stake slots for holding of the retention ribs 128 of the molded part. Each retaining rib 128 is operaby spaced and sized and/or arcuate in shape, to fit through and/or match the corresponding arcuate shape of the apertures 124, 126. While six heat stake ribs 128 are shown it is understood that more or less can be used depending on the application.

During assembly, the retainer 100 is moved towards the appliqué 102 such that each heat stake retaining rib 128 is in alignment with a corresponding aperture 124, 126 and then positioned through the corresponding aperture 124, 126. The retaining ribs 128 are heat staked to prevent the retaining ribs 128 from being pulled out of the apertures 124, 126, securing the connection between the retainer 100 and the appliqué.

Once the retainer 100 has been attached to the appliqué, the part 100 is attachable to a B-pillar, or the like, of a vehicle. This is achieved through the use of a fastener, which in this embodiment is a threaded screw, which is inserted into the aperture 118 and engages the single thread engagement feature 120. As the screw is inserted into the aperture 118, pressure is applied to the screw from the torque features 122, which prevents the screw from being removed from the aperture 118. This secures the retainer 100, and therefore, the door appliqué, to the B-pillar.

The retainer 100 of the present invention is typically designed to provide predetermined torque tension requirements in the installed application. The use of the heat stake retention ribs 128 engaged by arcuate securement slots 124, 126 in the gripping flange 104 allows for higher torque resistance, since the ribs withstand the rotary shearing torque during insertion of a fastener. This makes the present invention much more robust than previous designs. The torque to fail values can be adjusted to the application requirements. The value will be based on the radius, or centerline diameter of the aggregate of the rib arrangement. The larger the diameter of the aggregate of the radial rib arrangement, the higher the torque values. The fastener(s) require tension to ensure they resist backing out due to vibration.

Also, the part must be adequately secured to the B-pillar of the vehicle or the like. The sidewalls 114, 116 of the retainer 100 are used to meet the required torque tension requirements.

Referring now to FIGS. 8-12, wherein like numbers reflect like parts to FIGS. 1-3, in accordance with a preferred embodiment, there is provided a retainer shown generally at 200 which is made from a metal material, preferably spring steel as defined previously. The retainer 200 attaches to a part or appliqué 52. The retainer 200 has an attachment base generally indicated at 204, which in this embodiment is a formed low profile spring steel base.

The base 204 includes a slightly raised low profile doghouse portion 206 which includes a keyhole shown generally at 212 for receiving a base 207 of a clip portion 202 or "securing portion". The low profile doghouse portion 204 includes a central clip attachment portion 214 which is separated from the base 204 by a pair of walls 226 and 228. The walls 226, 228 are configured to provide a height. The height is just high enough such that generally the base of the clip 202 can be housed underneath inside of the doghouse portion 206. Preferably, the walls are substantially vertical although they can be configured at an angle as long as a predetermined height of the doghouse is maintained.

The base 204 of the retainer 200 includes at least one attachment portion 208 which includes at least one first attachment aperture 210 that is a heat staking slot to receive heat stake bosses or molded retention ribs 50 on the molded part. The attachment aperture 210 generally has smooth sides, without serrations, and is configured to provide a heat stake slot for holding of the retainer 200 onto the molded part 52 such as an appliqué which is attached.

Figure 8:
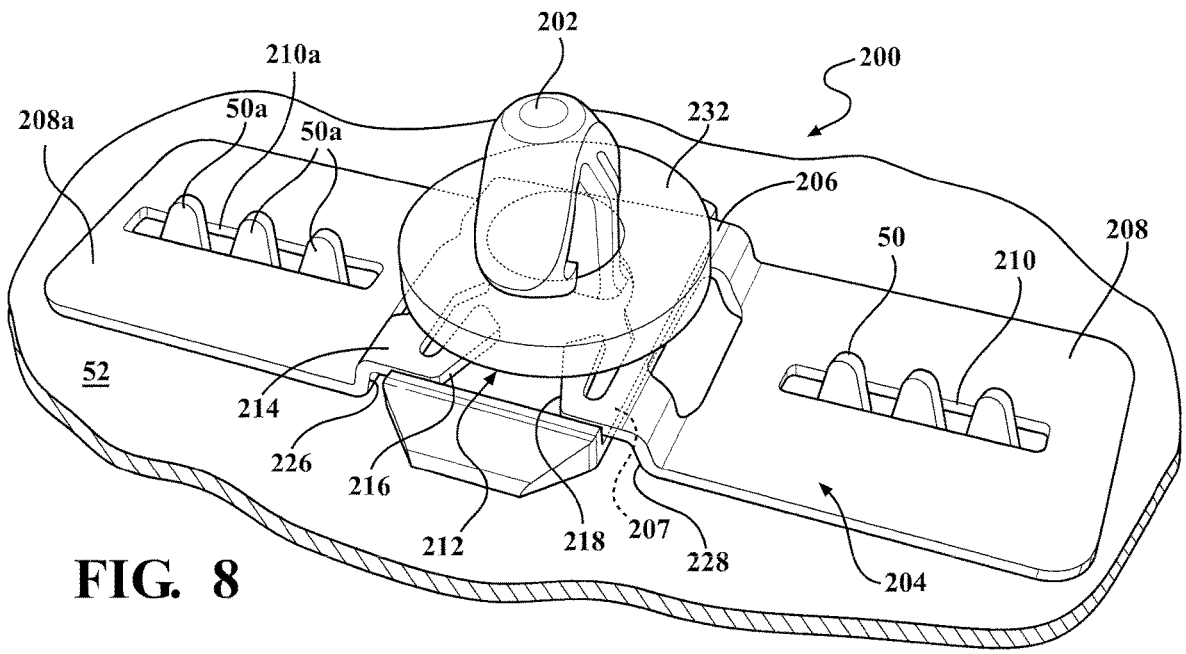
FIG. 8 is a perspective view of a retainer positioned for attachment to an appliqué, according to a preferred embodiment of the present invention.

Most preferably, the base 204 has a corresponding attachment portion 208a and two opposing attachment apertures 210, 210a spaced longitudinally along the same plane to each engage respective heat stake portions 50, 50a molded onto the part 52 (shown in FIG. 8). The attachment apertures 210, 210a require molded retention ribs 50, 50a, as described in further detail previously.

Accordingly, the retainer 200 provides heat staked attachment rather than "push-on", providing all of the benefits and superior results described in further detail previously.

The clip 202 is a nylon plastic clip. Other suitable clip materials are contemplated without departing from the scope of the invention.

Figure 12:
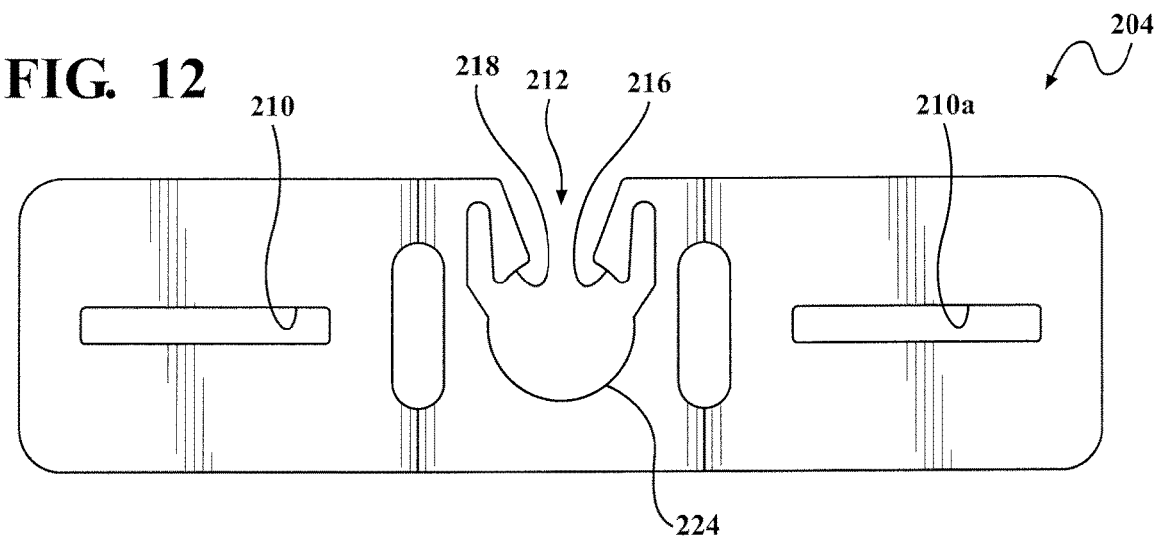
FIG. 12 is a top plan view of a base depicted in FIGS. 8-10 and 14 in accordance with both preferred embodiments of the present invention.

Referring more particularly to FIG. 12, the keyhole 212 for retaining the clip 202 includes deflectable fingers 216 and 218. These fingers 216, 218 are used when pushing a reduced diameter portion 219 of the clip 202 into the keyhole 212. The fingers 216, 218 are deflectable outwardly for allowing the base of the clip 202 to be inserted. Thereafter, the base is retained in the keyhole 212 by the fingers 216, 218. The keyhole 212 arrangement is provided with a rounded aperture portion 224 that is a larger diameter than the reduced diameter portion 219 of the clip such that positioning movement of the clip is facilitated such that variances in tolerances in the parts to be assembled may be accommodated.

Figure 9:
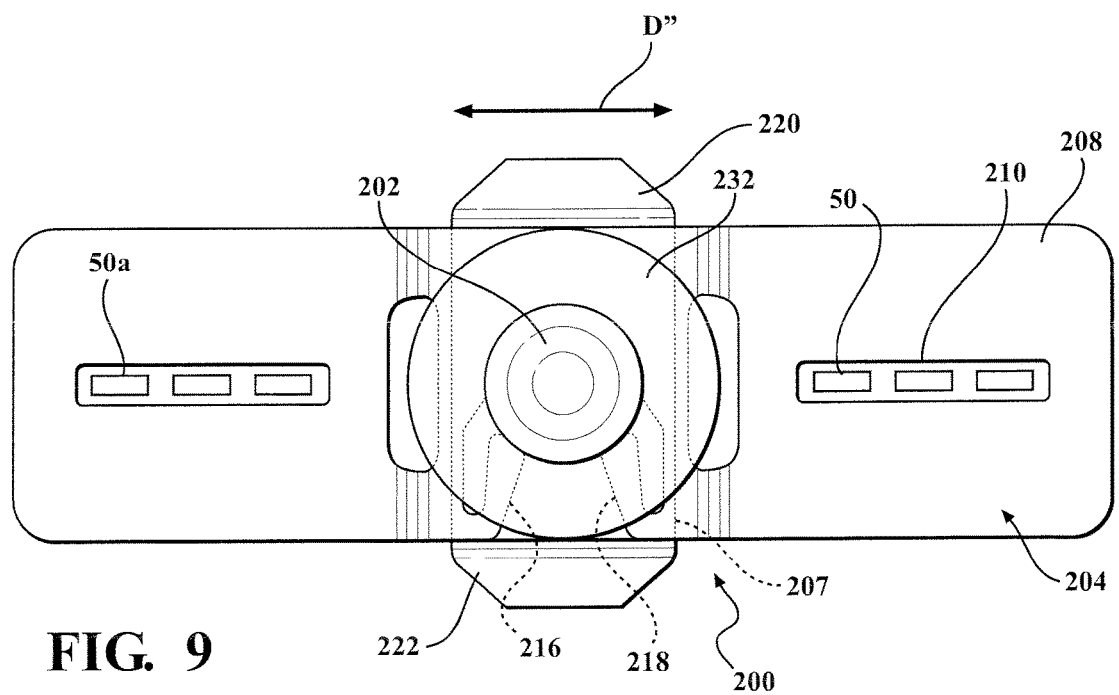
FIG. 9 is a top plan view of the retainer of FIG. 8 and depicting two directional clip float in accordance with the present invention.

The clip base 207 is provided with a pair of float limiters 220, 222, preferably, opposing nylon clip float limiters, which limit the clip float to two directions, horizontally indicated as "D" in FIG. 9. The walls 226, 228 are spaced a predetermined distance apart and the float limiters 220, 222 have a predetermined width. The amount of float of the clip 202 is limited by the horizontal distance between each float limiter 220, 222 to the respective walls 226, 228.

The clip 202 also includes a middle portion 230 spaced apart from and creating a gap (indicated as "h" in FIG. 11) between the base 207 and middle portion 230 of the clip 202. The presence of the middle portion 230 helps the clip 202 frictionally engage the central clip attachment portion 214. It is within the scope of this invention for the middle portion 230 to not be present.

The clip 202 also includes a washer 232, preferably, foam washer. The foam washer 232 is disposed adjacent to the top surface of the middle portion 230 of the clip 202 above the carrier 204.

During assembly, the carrier 204 is moved towards the appliqué 52 such that each molded rib 50, 50a is in alignment with a corresponding aperture 210, 210a and then positioned through the corresponding aperture 210, 210a. The ribs 50, 50a are heat staked to prevent the ribs 50, 50a from being pulled out of the apertures 210, 210a, securing the connection between the doghouse and the appliqué. Once attached to a part or appliqué 52, the part is attached to the vehicle, e.g., to a B-pillar of a vehicle by press fitting the clip 202 into an aperture in a vehicle.

Figure 10:
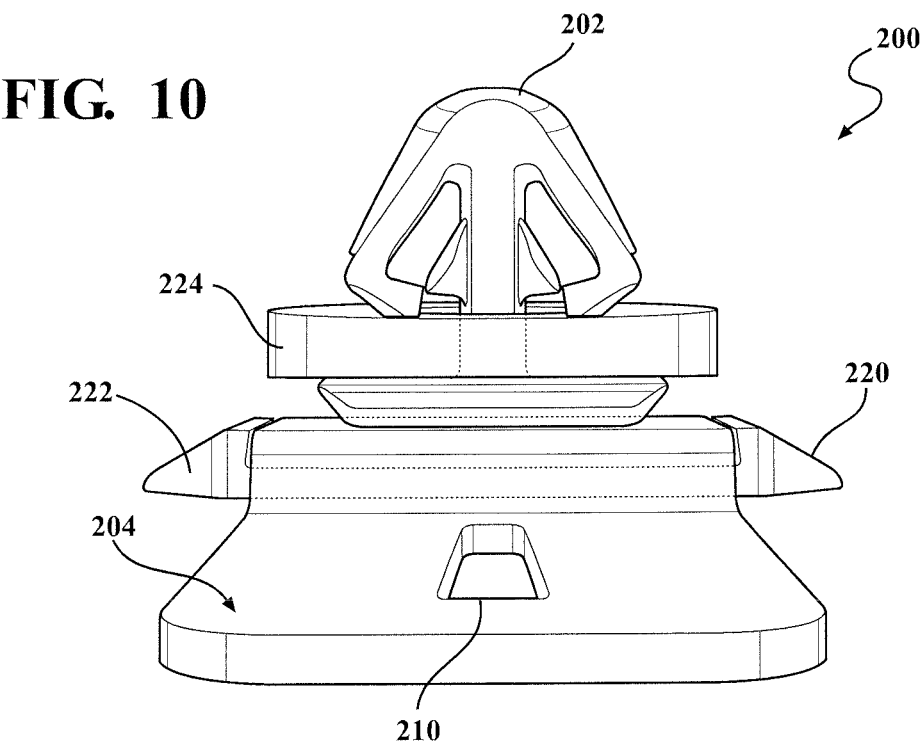
FIG. 10 is a front elevation view of the retainer of FIGS. 8-9 in accordance with the present invention.
Figure 11:
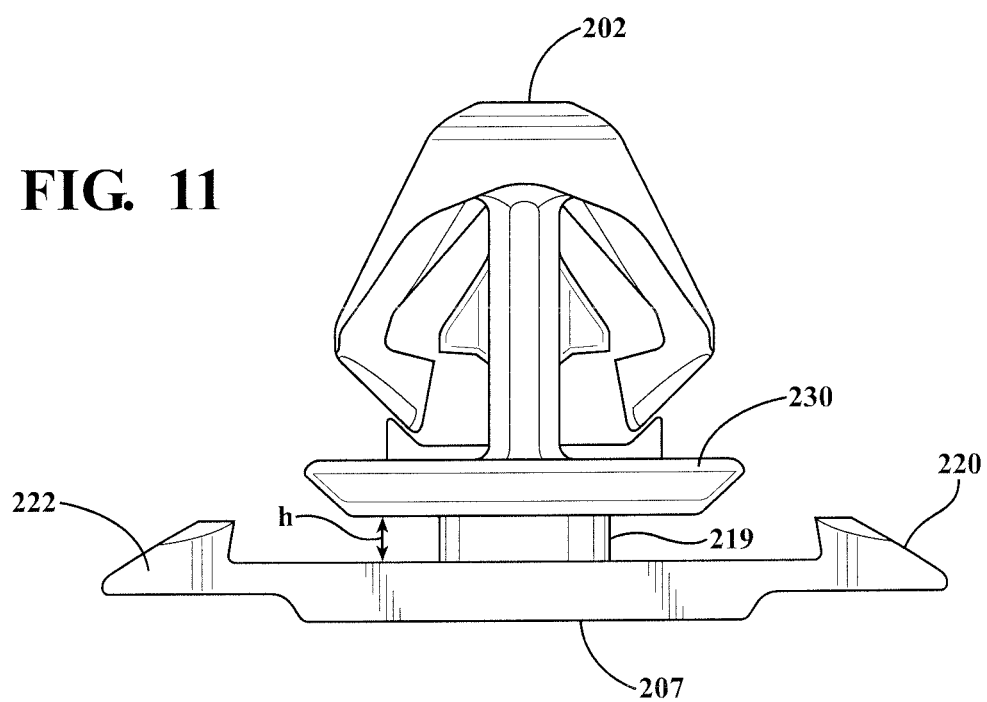
FIG. 11 is a side elevation view of a clip depicted in FIGS. 8-10 with float limiters for horizontal float in accordance with the present invention.
Figure 13:
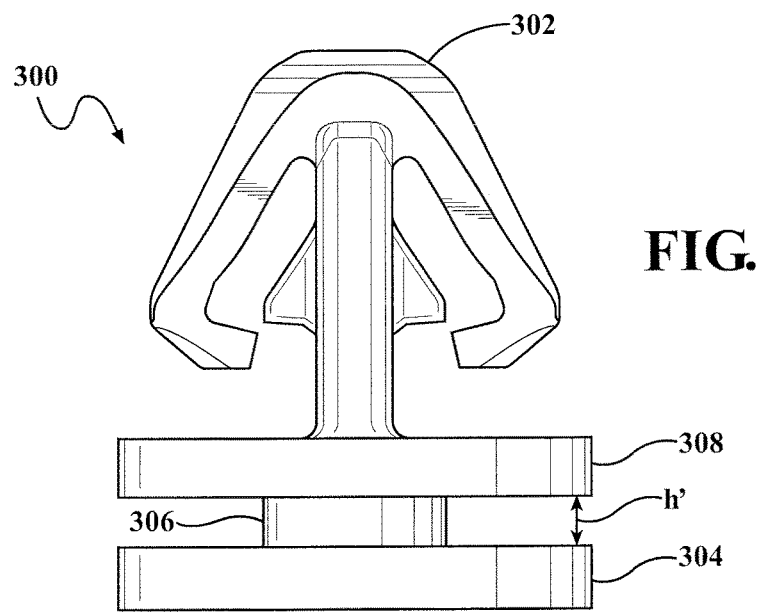
FIG. 13 is a front elevation view of a clip without limiters for 360 degree float, in accordance with another preferred embodiment of the present invention.
Figure 14:
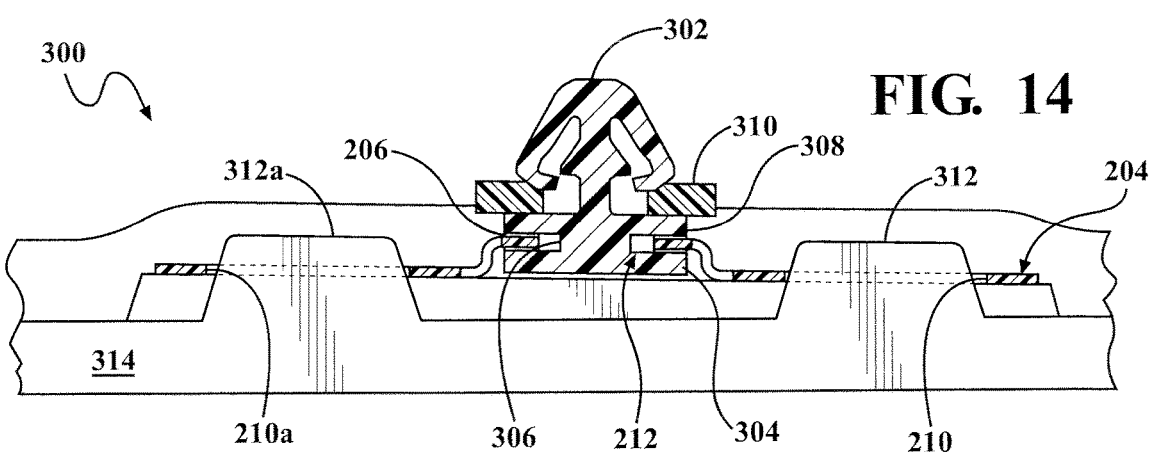
FIG. 14 is a sectional view of a retainer positioned for attachment to an appliqué, including the clip of FIG. 13 and base of FIG. 12 in accordance with the present invention.

Referring now to FIGS. 12-14, wherein like numbers reflect like parts to FIGS. 8-10, in accordance with another preferred embodiment, there is provided a retainer shown generally at 300 for 360 degrees of clip float. The retainer base is made from a metal material, preferably spring steel as defined previously, and attaches to a part or appliqué 52. The retainer 300 has the an attachment base, which in this embodiment is a formed low profile spring steel base generally indicated at 204 (FIG. 12) including the slightly raised low profile doghouse portion 206 which includes the keyhole 212, as further described previously.

A base 304 of a clip portion 302 or securing portion is received within the low profile doghouse portion 206 of the base 204. The clip 302 is housed underneath inside of the doghouse portion 206.

The fingers 216, 218 of the base 204 are used when pushing a reduced diameter portion 306 of the clip 202 into the keyhole 212. The fingers 216, 218 are deflectable outwardly for allowing the base 304 of the clip 302 to be inserted into the doghouse. Thereafter, the base is retained in the keyhole 212 by the fingers 216, 218. The keyhole's 212 rounded aperture portion 224 is a larger diameter than the reduced diameter portion 306 of the clip 302 such that positioning movement of the clip is facilitated such that variances in tolerances in the parts to be assembled may be accommodated. The amount of float of the clip 302 is limited by the keyhole 212. Accordingly, there is provided 360 degrees of clip float in this attachment for tolerance considerations.

The clip 302 is a nylon plastic clip. Other suitable clip materials are contemplated without departing from the scope of the invention.

The clip 302 also includes a middle portion 308 spaced apart from and creating a gap (indicated as "h'" in FIG. 13) between the base 304 and middle portion 308 of the clip 302. The presence of the middle portion 308 helps the clip 302 frictionally engage the central clip attachment portion 214. It is within the scope of this invention for the middle portion 308 to not be present.

The retainer 300 also includes a washer 310, preferably, foam washer. The foam washer 310 is disposed adjacent to the top surface of the middle portion 308 of the clip 302 above the carrier 204.

As further described previously, at least one attachment portion 208 is provided with at least one attachment aperture 210 that is a heat staking slot to receive heat stake bosses or molded retention ribs or heat stake ribs 312 on the molded part such as an appliqué 314 which is attached. In addition, as described in further detail previously, the base 204 has a corresponding attachment portion 208a and two opposing attachment apertures 210, 210a spaced longitudinally along the same plane to each engage respective heat stake portions 312, 312a molded onto the part 314. The heat stake portions 312, 312a have angled ends operable to provide alignment and positioning.

During assembly, the carrier 204 is moved towards the appliqué 52 such that each molded rib 50, 50a is in alignment with a corresponding aperture 210, 210a and then positioned through the corresponding aperture 210, 210a. The ribs 50, 50a are heat staked to prevent the ribs 50, 50a from being pulled out of the apertures 210, 210a, securing the connection between the doghouse and the appliqué. Once attached to a part or appliqué 52, the part is attached to the vehicle, e.g., to a B-pillar of a vehicle by press fitting the clip 202 into an aperture in a vehicle.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A doghouse retainer arrangement, comprising:
   a securing portion operable for being connected to a vehicle;
   at least two molded heat stake retention ribs formed on a part for a vehicle; and
   an attachment base operably coupled to the securing portion, said attachment base including at least two attachment apertures with smooth parallel elongated sidewalls and that are not serrated and smooth parallel end walls, said at least two molded heat stake retention ribs are angled having a shorter length at the top that extends through the corresponding aperture and longest length at the bottom operable to provide alignment and positioning through corresponding apertures of greater length than said top of each molded heat stake retention rib, respectively, said at least two molded heat stake retention ribs received in the at least two attachment apertures and securing the connection to the part, said at least two attachment apertures arranged along a central longitudinal axis effective to provide a high force to failure result to assure robustness and retention and to allow tolerances in robotic assembly and minimize scrap, said securing portion including a base that has a flat upper surface and flat lower surface abutting said attachment base and including a foam washer.

2. The doghouse retainer arrangement of claim 1, wherein the attachment base is a spring steel carrier including a raised low profile doghouse portion having a keyhole for receiving the securing portion.

3. The doghouse retainer arrangement of claim 2, further comprising a pair of walls that provide height to the raised low profile doghouse portion.

4. The doghouse retainer arrangement of claim 2, further comprising an aperture formed on the vehicle, wherein the securing portion is a clip for connecting to the vehicle by press fitting into the aperture.

5. The doghouse retainer arrangement of claim 4, wherein the clip is a nylon winged clip.

6. The doghouse retainer arrangement of claim 4, wherein the keyhole is a rounded keyhole for 360 degrees of float of the clip.

7. The doghouse retainer arrangement of claim 4, wherein the keyhole is a slotted keyhole to limit float of the clip to two directions.

8. The doghouse retainer arrangement of claim 4, wherein the keyhole includes two or more fingers that are deflectable for insertion and retention of the clip within the keyhole.

9. The doghouse retainer arrangement of claim 8, wherein the clip further includes opposing float limiters for limiting clip float to predetermined desired directions.

10. The doghouse retainer arrangement of claim 4, wherein the clip further includes a reduced diameter portion that is received in the keyhole and is smaller than the keyhole to allow positioning movement of the clip during assembly to account for any variance in tolerances.

11. The doghouse retainer arrangement of claim 10, wherein the clip further includes a clip base that is larger than the reduced diameter portion of the clip.

12. The doghouse retainer arrangement of claim 1, wherein the attachment base also includes opposing turned up carrier walls to improve carrier flatness following austempering processing.

13. The doghouse retainer arrangement of claim 1, wherein the attachment base includes two or more attachment portions, each attachment portion having a respective one of the attachment apertures receiving a plurality of the heat stake retention ribs.

14. A retainer arrangement, comprising:
   at least one aperture formed on a vehicle;
   a securing portion operable for being connected to the vehicle;
   a foam washer;
   a plurality of heat stake retention ribs formed on a part for a vehicle;
   an attachment base operably coupled to the securing portion;
   at least two attachment portions of the attachment base, each attachment portion including a respective attachment aperture arranged along a central longitudinal axis of the attachment base in an inline design effective to provide an engineered tensile failure mode, said plurality of heat stake retention ribs received in the attachment apertures and secure a connection to the part, wherein said plurality of heat stake retention ribs are angled, each have a shorter length at the top that extends through the corresponding aperture and longer length at the bottom operable to provide alignment and positioning through said respective attachment aperture of greater length than said top of each heat stake retention rib, respectively, and
   wherein the attachment apertures of the attachment base each comprise smooth parallel end walls without a positioning tab and smooth parallel elongated sidewalls and do not include serrations.

15. The doghouse retainer arrangement of claim 14, wherein the securing portion is a winged clip and the attachment base is a spring steel carrier including a raised low profile doghouse portion having a keyhole for receiving the winged clip.

16. The doghouse retainer arrangement of claim 15, wherein the keyhole is a rounded or a slotted keyhole for desired float of the winged clip.

17. The doghouse retainer arrangement of claim 15, wherein the winged clip further comprises:
   a reduced diameter portion that is received in the keyhole;
   a clip base that is larger than the reduced diameter portion of the clip and has a flat upper surface or flat lower surface abutting said attachment base; and
   the foam washer.

18. A method for attaching a part to a vehicle using a doghouse retainer arrangement, comprising the steps of:
   providing a plurality of heat stake retention ribs formed on the part said plurality of heat stake retention ribs including angled ends, such that each heat stake retention rib are angled and have the shortest length at the top that extends through the corresponding aperture and longest length at the bottom, said top length operable to provide alignment and positioning through corresponding apertures of greater length than the top of each heat stake retention rib, respectively;
   providing an aperture on a vehicle;
   providing a securing portion that is a clip operable for being connected to the aperture of the vehicle and including a foam washer;
   providing an attachment base that is a spring steel carrier including a raised low profile doghouse portion having a keyhole for receiving the clip;
   providing at least two attachment portions of the attachment base, each of said attachment portions including an elongated attachment aperture with smooth vertical end walls and smooth parallel elongated vertical sidewalls having no serrations,
   pushing the plurality of heat stake retention ribs through the attachment apertures, respectively, and heat staking the ribs for securing the connection to the part; and
   pushing the clip into the aperture of the vehicle to connect the part and retainer arrangement to the vehicle.

\* \* \* \* \*